(12) United States Patent
Kawano et al.

(10) Patent No.: US 8,625,184 B2
(45) Date of Patent: Jan. 7, 2014

(54) OPTICAL EXPOSURE APPARATUS AND SYSTEMS

(75) Inventors: Katsunori Kawano, Kanagawa (JP); Jiro Minabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 965 days.

(21) Appl. No.: 12/726,599

(22) Filed: Mar. 18, 2010

(65) Prior Publication Data

US 2011/0013156 A1  Jan. 20, 2011

(30) Foreign Application Priority Data

Jul. 15, 2009  (JP) .................................. 2009-166950

(51) Int. Cl.
 *G03H 1/02*  (2006.01)
(52) U.S. Cl.
 USPC .................................. 359/28; 359/15; 359/35
(58) Field of Classification Search
 None
 See application file for complete search history.

(56) References Cited

U.S. PATENT DOCUMENTS

| | | | |
|---|---|---|---|
| 4,580,151 A * | 4/1986 | Bamba | 347/135 |
| 2009/0168130 A1 * | 7/2009 | Someno | 359/12 |
| 2010/0238531 A1 * | 9/2010 | Yasuda et al. | 359/15 |
| 2010/0259739 A1 * | 10/2010 | Minabe et al. | 355/67 |
| 2012/0188327 A1 * | 7/2012 | Minabe | 347/224 |

FOREIGN PATENT DOCUMENTS

| JP | A 4-201270 | 7/1992 |
|---|---|---|
| JP | A 2000-330058 | 11/2000 |
| JP | A 2007-237576 | 9/2007 |

* cited by examiner

*Primary Examiner* — Arnel C Lavarias
(74) *Attorney, Agent, or Firm* — Oliff & Berridge, PLC

(57) ABSTRACT

An exposure apparatus includes a substrate in which plural light-emitting devices are arrayed one-dimensionally or two-dimensionally; and a hologram recording layer that is disposed on the substrate, plural holograms being recorded in the hologram recording layer by holographic interference between a first beam and a second beam such that a predetermined number of beam spots are disposed in the hologram recording layer in a predetermined array direction according to a portion of light-emitting devices, the portion of light-emitting devices being selected as emitters from the plural light-emitting devices, the beam spot being formed by a light beam of the second beam, the first beam passing through an optical path of diffusion light that passes through the emitter, the second beam passing through an optical path of convergent light that converges at a predetermined distance outside the optical path of the first beam.

7 Claims, 12 Drawing Sheets

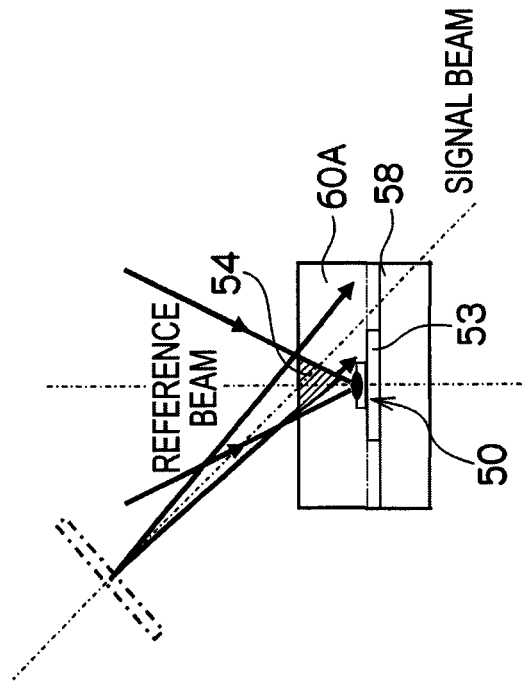
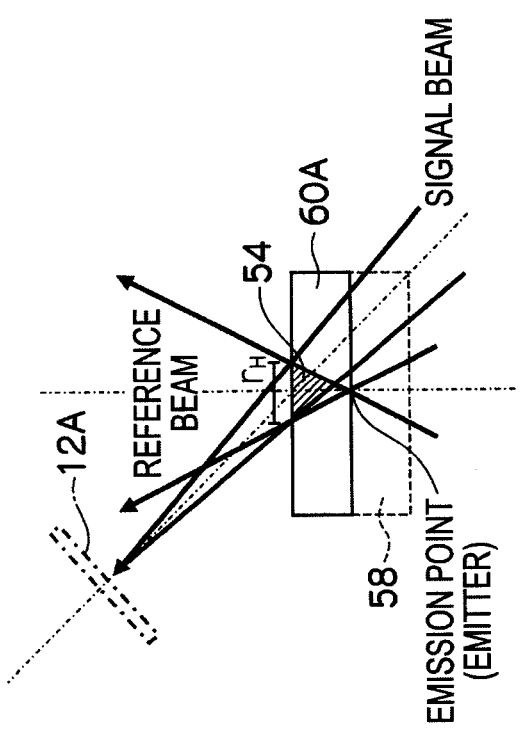

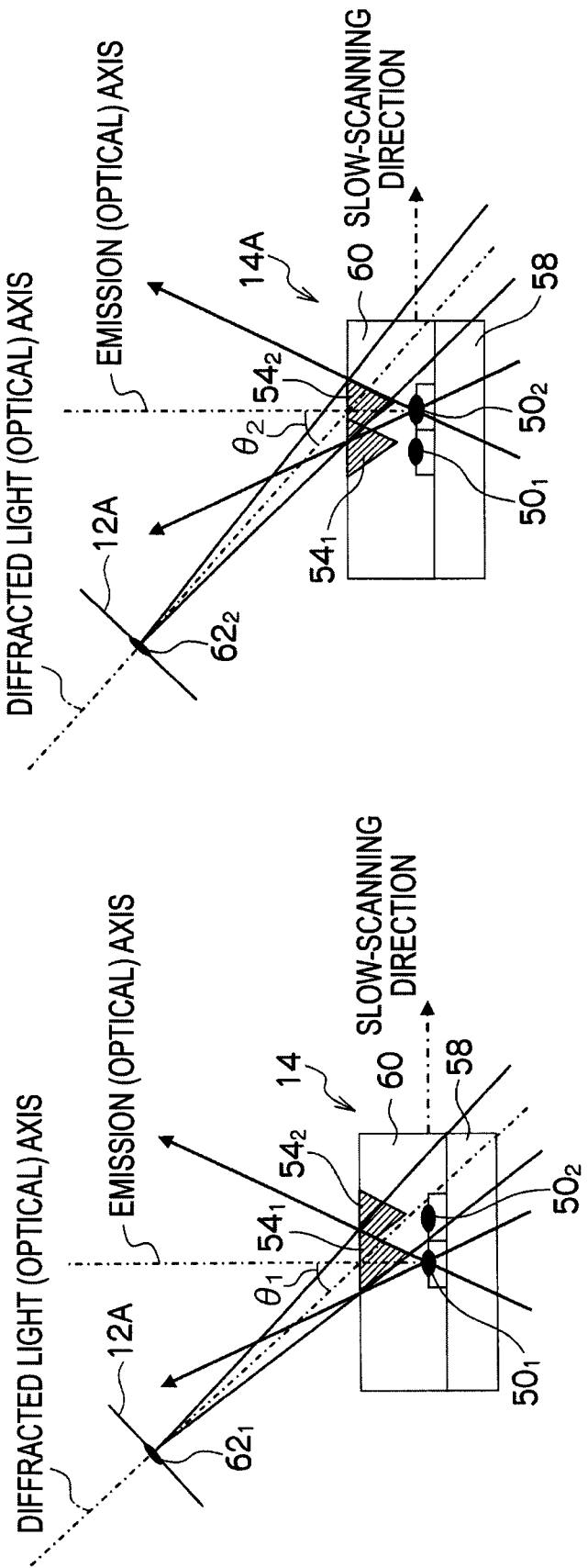

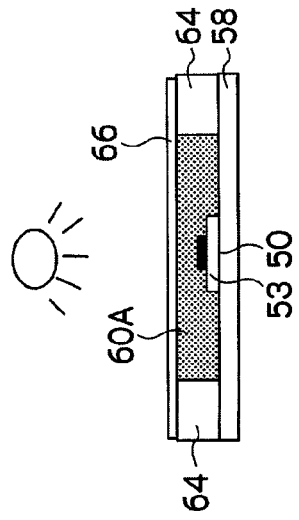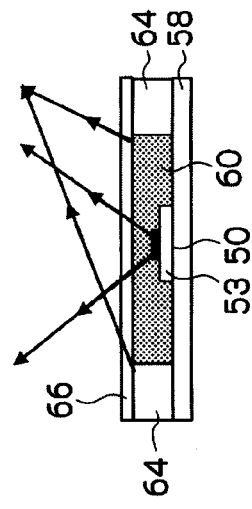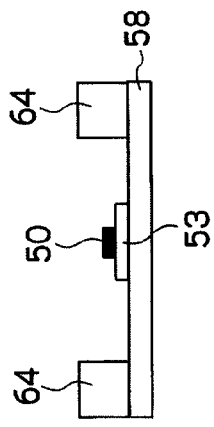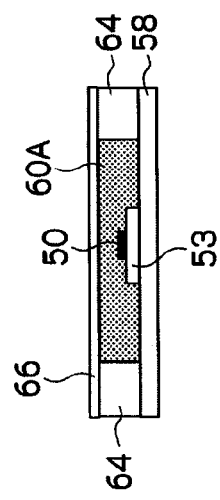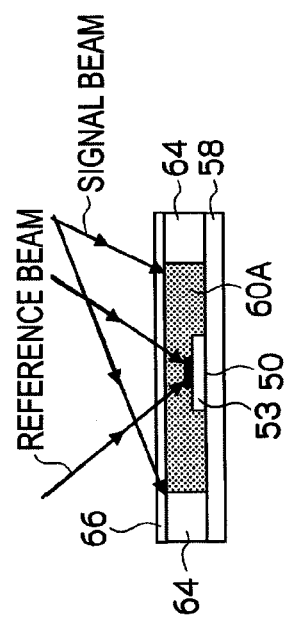

OPTICAL EXPOSURE APPARATUS AND SYSTEMS

CROSS REFERENCE TO RELATED APPLICATIONS

This application is based on and claims priority under 35USC 119 from Japanese patent Application No. 2009-166950 filed on Jul. 15, 2009.

BACKGROUND

1. Technical Field

The present invention relates to an exposure apparatus, an image forming apparatus, and a hologram recording apparatus.

2. Related Art

There has been proposed a printing apparatus including plural switching elements each of which converts a laser beam emitted from a laser light source into a spot beam and plural holographic optical elements each of which causes the spot beam to converge, and the switching elements and the holographic optical elements are provided in correspondence with each other.

There has also been proposed an exposure apparatus including plural light-emitting devices, a first lens array, and a second lens array. The plural light-emitting devices are arrayed on a light source substrate. The first lens array includes plural diffraction positive lenses each of which diffracts transmitted light to cause beams of the light to converge, thereby forming an image. The second lens array includes plural lenses. The first lens array is sandwiched between the second lens array and the plural light-emitting devices. The plural diffraction positive lenses are respectively superimposed with the plural light-emitting devices in a direction perpendicular to the light source substrate.

There has also been proposed an optical writing apparatus, in which an image is divided into many micro pixels, one or plural light sources emit light beams having an intensity corresponding to a density of each pixel, and an image recording medium is scanned with a bright point of the light beam to sequentially expose each pixel region, thereby writing the image. The image recording medium is irradiated with light having a light quantity density that is equal to or more than a threshold, the image recording medium is exposed to form a latent image by a surface potential change or a chemical change or the image recording medium is exposed to form an image having a density change. In the optical writing apparatus, units as many as the pixels are arrayed in a fast-scanning direction. One unit includes a light converging element, a micro optical aperture, a collimator, and a holographic optical element, which are arranged sequentially from the light source side between the light source and the image recording medium. The light converging element causes the light beams to converge. The optical aperture is provided at a position at which the light beam converges. The collimator forms the light beam outgoing from the optical aperture into a substantially parallel light beam. The holographic optical element radiates the light beam while splitting the light beam into plural directions, and the holographic optical element causes the plural light beams to converge onto substantially the same plane.

An object of the invention is to provide, in an exposure apparatus in which beams emitted from plural light-emitting devices formed on a substrate are converged by a hologram to form converged beam spots arranged in a line on an exposed surface, an exposure apparatus that may obtain a line including a desired number of beam spots (light collecting points) at the exposed surface, even if a portion of the plural light-emitting devices is defective. Another object of the invention is to provide an image forming apparatus in which the exposure apparatus is used. A further object of the invention is to provide a hologram recording apparatus that records a hologram in a hologram recording layer in the process of producing the exposure apparatus.

SUMMARY

According to an aspect of the present invention, there is provided an exposure apparatus including a substrate in which a plurality of light-emitting devices are arrayed one-dimensionally or two-dimensionally; and a hologram recording layer that is disposed on the substrate, a plurality of holograms being recorded in the hologram recording layer by holographic interference between a first beam and a second beam such that a predetermined number of beam spots, each of which is formed by converging of the second beam, are disposed in the hologram recording layer in a predetermined array direction according to a portion of light-emitting devices being selected as emitters (emission points) from the plurality of light-emitting devices, the first beam passing through an optical path of diffusion light that passes through the hologram recording layer from a position corresponding to the emitter, and the second beam passing through an optical path of convergent light that converges at a predetermined distance outside the optical path of the first beam.

BRIEF DESCRIPTION OF THE DRAWINGS

Exemplary embodiments of the invention will be described in detail based on the following figures, wherein:

FIGS. 4A and 4B are views illustrating a state in which holographic optical element is formed in a hologram recording layer;

FIGS. 5A and 5B are views illustrating a state in which diffracted light is produced from the holographic optical element;

FIGS. 6A to 6E are views illustrating the steps of the LED printhead producing process;

DETAILED DESCRIPTION

An exemplary embodiment of the invention will be described in detail with reference to the drawings.

Image Forming Apparatus

Figure 1:
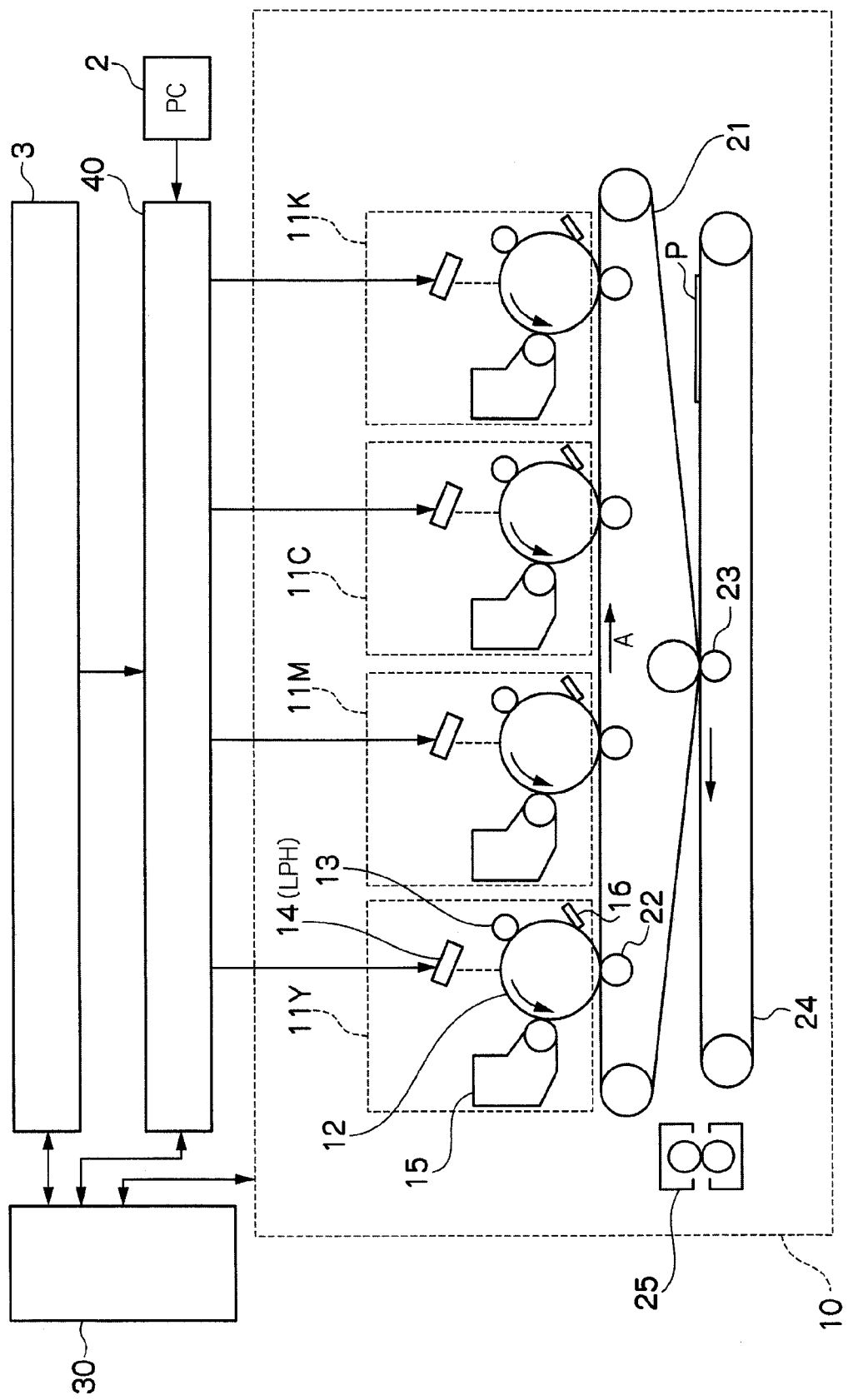
FIG. 1 is a schematic diagram illustrating an example of a configuration of an image forming apparatus according to an exemplary embodiment of the invention.

FIG. 1 is a schematic diagram illustrating an example of a configuration of an image forming apparatus according to an exemplary embodiment of the invention. The image forming apparatus is a tandem digital full-color printer. The image forming apparatus includes an image forming process section 10, a control section 30, and an image processing section 40. The image forming process section 10 forms an image according to image data of each color. The control section 30 controls an operation of the image forming apparatus. The image processing section 40 is connected to an image reading device 3 and an external device such as a Personal Computer (PC) 2, and the image processing section 40 performs predetermined image processing on the image data received from the image reading device 3 or PC 2.

The image forming process section 10 includes four image forming units 11Y, 11M, 11C, and 11K that are arranged in parallel at constant intervals. The image forming units 11Y, 11M, 11C, and 11K form Yellow (Y), Magenta (M), Cyan (C), and Black (K) toner images, respectively. The image forming units 11Y, 11M, 11C, and 11K may be collectively referred to as "image forming unit 11".

Each image forming unit 11 includes a photosensitive drum 12, a charging device 13, an LED (light emitting diode) printhead (LPH) 14, a development device 15, and a cleaner 16. The photosensitive drum 12 is an image holding member that forms an electrostatic latent image to hold a toner image. The charging device 13 uniformly charges a surface of the photosensitive drum 12 to a predetermined potential. LPH 14 is an exposure apparatus that exposes the photosensitive drum 12 charged by the charging device 13. The development device 15 develops the electrostatic latent image obtained by LPH 14. The cleaner 16 cleans the surface of the photosensitive drum 12 after transfer.

LPH 14 is a long bar shaped printhead having a length substantially identical to a length in an axis-line direction of the photosensitive drum 12. In LPH 14, plural LEDs are arrayed (in a line) along a length direction. LPH 14 is disposed around the photosensitive drum 12 such that the length direction of LPH 14 is oriented along the axis-line direction of the photosensitive drum 12. In the exemplary embodiment, LPH 14 has a long operating distance (working distance), and LPH 14 is disposed away from the surface of photosensitive drum 12 by several centimeters. Therefore, the width in the circumferential direction of the photosensitive drum 12 which is occupied is reduced, thereby reducing crowding of the area around the photosensitive drum 12.

The image forming process section 10 also includes an intermediate transfer belt 21, a primary transfer roller 22, a secondary transfer roller 23, and a fixing device 25. The color toner images formed by the photosensitive drums 12 of the image forming units 11 are plurally transferred to the intermediate transfer belt 21. The primary transfer roller 22 sequentially transfers the color toner images of the image forming units 11 to the intermediate transfer belt 21 (primary transfer). The secondary transfer roller 23 collectively transfers the superimposed toner images transferred to the intermediate transfer belt 21 to a sheet P that is a recording medium (secondary transfer). The fixing device 25 fixes the secondary-transferred image onto the sheet P.

An operation of the image forming apparatus will be described. First, the image forming process section 10 performs an image forming operation based on a control signal such as a synchronous signal supplied from the control section 30. At this point, the image processing section 40 performs image processing on the image data input from the image reading device 3 or PC 2, and the image data is supplied to each image forming unit 11 through an interface.

For example, in the yellow image forming unit 11Y, the surface of the photosensitive drum 12 which is charged evenly to a predetermined potential by the charging device 13 is exposed with LPH 14 that emits light based on image data obtained from the image processing section 40, thereby forming an electrostatic latent image on the photosensitive drum 12. That is, when each LED of LPH 14 emits light based on the image data, slow-scanning is performed by rotation of the photosensitive drum 12 while fast-scanning is performed with respect to the surface of the photosensitive drum 12, thereby forming the electrostatic latent image on the photosensitive drum 12. The development device 15 develops the formed electrostatic latent image to form a yellow toner image on the photosensitive drum 12. Similarly, the image forming unit 11M, 11C, and 11K form magenta, cyan, and black toner images.

The color toner images formed by the image forming units 11 are sequentially electrostatically attracted and transferred onto the intermediate transfer belt 21, which rotates in the direction of an arrow A of FIG. 1, by the primary transfer roller 22 (primary transfer). The superimposed toner images are formed on the intermediate transfer belt 21. The superimposed toner images are conveyed to a region (secondary transfer section) where the secondary transfer roller 23 is provided according to the movement of the intermediate transfer belt 21. When the superimposed toner images are conveyed to the secondary transfer section, a sheet P is supplied to the secondary transfer section in synchronization with the conveyance of the toner image to the secondary transfer section.

In the secondary transfer section, the superimposed toner images are collectively electrostatically transferred onto the conveyed sheet P by a transfer electric field formed by the secondary transfer roller 23 (secondary transfer). The sheet P to which the superimposed toner images are transferred in the electrostatic manner is peeled off from the intermediate transfer belt 21, and the sheet P is conveyed to the fixing device 25 by the conveying belt 24. The unfixed toner image on the sheet P conveyed to the fixing device 25 is subjected to a fixing treatment with heat and pressure by the fixing device 25, thereby fixing the toner image onto the sheet P. The sheet P at which the fixed image is formed is outputted to a sheet output tray (not shown) provided at an output section of the image forming apparatus.

When the LPH operating distance increases, the area around the photosensitive drum is not crowded, and the overall size of the image forming apparatus may be reduced. In a conventional LPH in which a rod lens is used, an optical path length (operating distance) from an edge face of a lens array of the rod lens to an image forming point is several millimeters, and the ratio of space around the photosensitive drum occupied by the exposure apparatus increases. In an LPH in which LED emitting incoherent light (light waves having no interference) is used, generally coherency decreases to generate a blurred spot (chromatic aberration), and as a result a micro spot may be difficult to form.

LED Printhead (LPH)

Figure 2:
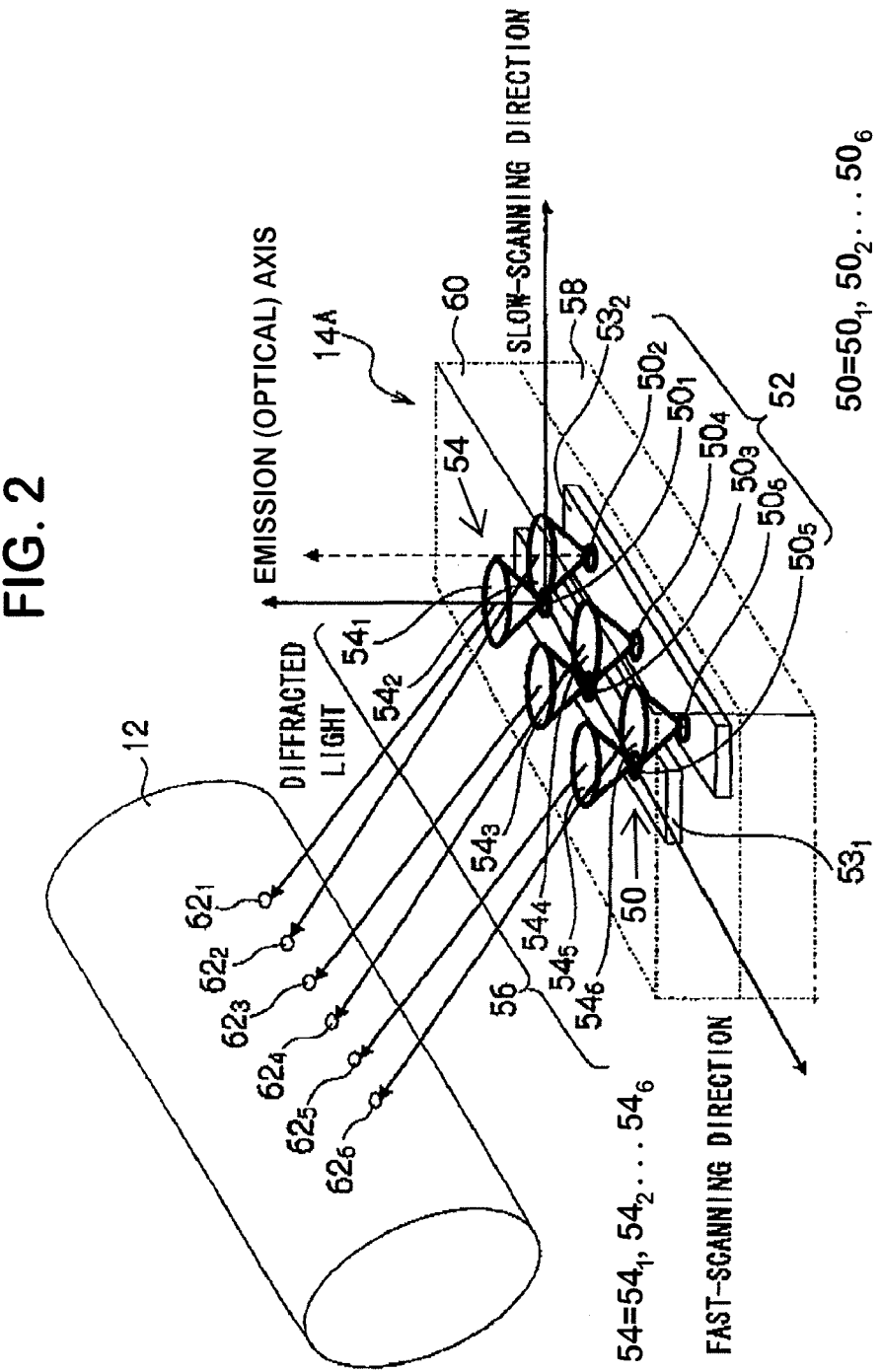
FIG. 2 is a schematic perspective view illustrating an example of a configuration of an LED printhead of an exposure apparatus of the exemplary embodiment.
Figure 3A:
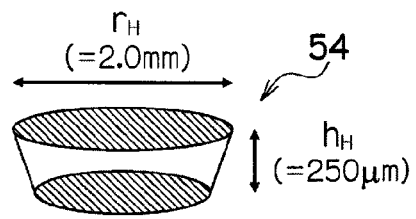
FIG. 3A is a perspective view illustrating a schematic shape of a holographic optical element.
Figure 3B:
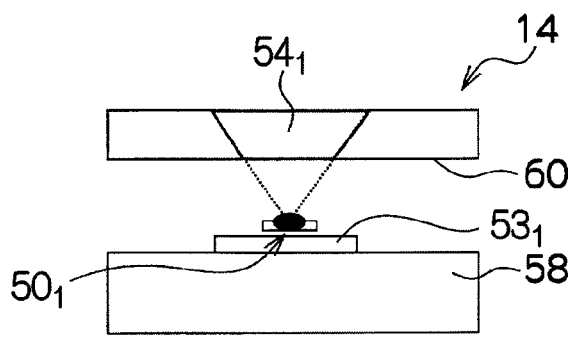
FIG. 3B is a sectional view in a slow-scanning direction of the LED printhead.
Figure 3C:
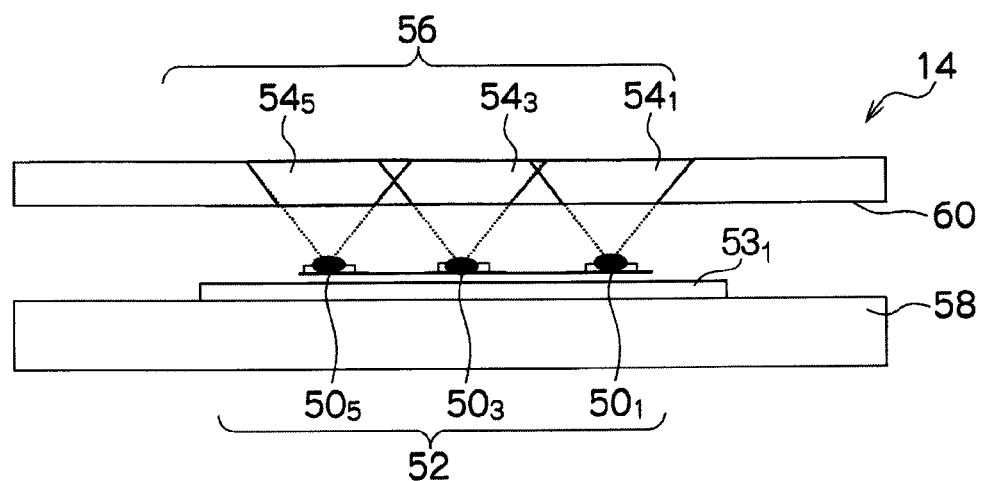
FIG. 3C is a sectional view along a first straight line that extends in a fast-scanning direction of the LED printhead.

FIG. 2 is a schematic perspective view illustrating an example of a configuration of the LED printhead that is the exposure apparatus of the exemplary embodiment. FIG. 3A is a perspective view illustrating a schematic shape of a holographic optical element, FIG. 3B is a sectional view in a slow-scanning direction of the LED printhead, and FIG. 3C is a sectional view along a first straight line that extends in a fast-scanning direction of the LED printhead.

As illustrated in FIG. 2, the LED printhead (LPH 14) includes an LED array 52 including plural LEDs $50_1$, $50_2$, $50_3$, $50_4$, $_5$, and $50_6$, (collectively reffered to herein as 50) and a holographic optical element array 56 including plural holographic optical elements 54 corresponding to each of the plural LEDs 50. In FIG. 2, the LED array 52 includes six LEDs $50_1$ to $50_6$, and the holographic optical element array 56 includes six holographic optical elements $54_1$ to $54_6$. When LEDs $50_1$ to $50_6$ or the holographic optical elements $54_1$ to $54_6$ are not distinguished from one another, LED $50_1$ to $50_6$ may be collectively referred to as "LED 50", and the holographic optical elements $54_1$ to $54_6$ may be collectively referred to as "holographic optical element 54".

Each of the plural LEDs 50 is mounted on a long bar shaped LED substrate 58 along with a driving circuit (not illustrated) that drives LED 50. As described above, LEDs 50 are arrayed along the direction parallel to the axis-line direction of the photosensitive drum 12. The direction in which LEDs 50 are arrayed is a "fast-scanning direction". LEDs 50 are arrayed such that an interval between two LEDs 50 adjacent to each other is kept constant in a fast-scanning direction. The slow-scanning is performed by the rotation of the photosensitive drum 12, and the direction orthogonal to the "fast-scanning direction" is indicated as a "slow-scanning direction".

Various configurations of LED arrays such as an LED array in which plural LEDs are mounted on the substrate in units of chips may be used as the LED array 52. When plural LED chips in which plural LEDs are arrayed are mounted, the plural LED chips may be disposed in series or the plural LED chips may be disposed in a staggered manner. At least two LED chips may be disposed in the slow-scanning direction.

As illustrated in FIG. 2, in the exemplary embodiment, an LED chip $53_1$ and an LED chip $53_2$ are mounted on a LED substrate 58 in LPH 14. Three LEDs $50_1$, LED $50_2$, and LED $50_3$ are arrayed in the LED chip $53_1$, and three LED $50_4$, LED $50_5$, and LED $50_6$ are arrayed in the LED chip $53_2$. The LED chip $53_1$ and the LED chip $53_2$ are disposed in parallel in the fast-scanning direction, and the LED chip $53_1$ and the LED chip $53_2$ are offset in the slow-scanning direction by a specific interval.

Although the LED chip $53_1$ and the LED chip $53_2$ are separated from each other, plural LEDs 50 are arrayed such that the interval between two LEDs 50 adjacent to each other is constant in the fast-scanning direction. For example, the interval between LED $50_2$ and LED $50_3$ in the fast-scanning direction is equal to the interval between LED $50_3$ and LED $50_4$ in the fast-scanning direction.

LED $50_1$, LED $50_3$, and LED $50_5$ are arrayed on a first straight line along the fast-scanning direction to form a first portion of the LED array 52. LED $50_2$, LED $50_4$, and LED $50_6$ are arrayed on a second straight line along the fast-scanning direction to form a second portion of the LED array 52. The first straight line and the second straight line are separated by a specific interval in the slow-scanning direction. The interval between the first straight line and the second straight line is substantially equal to the interval between LEDs 50 in the fast-scanning direction.

A hologram recording layer 60 is formed on the LED substrate 58 such that the LED chip $53_1$ and the LED chip $53_2$ are covered therewith. In the hologram recording layer 60, the plural holographic optical elements $54_1$ to $54_6$ are formed along the fast-scanning direction according to the plural LEDs $50_1$ to $50_6$. The holographic optical elements 54 are arrayed such that the interval between two holographic optical elements 54 adjacent to each other in the fast-scanning direction is equal to the interval between LEDs 50 in the fast-scanning direction.

In FIG. 2, for the sake of convenience, holographic optical elements 54 are formed corresponding to all the LEDs 50. However, as described later, in the exemplary embodiment, the plural LEDs 50 may be arrayed in excess, and the plural holographic optical elements 54 may be formed corresponding to a part of the plural LEDs 50 (see FIG. 7). This "selective formation of a hologram" is described below. In FIG. 2, for the sake of convenience, the holographic optical elements 54 are illustrated so as not to overlap each other. However, as described later, the holographic optical element 54 having a large diameter is formed such that the two adjacent holographic optical elements 54 overlap each other.

The holographic optical element array 56 is formed in the hologram recording layer 60 formed on the LED substrate 58. The hologram recording layer 60 is made of a polymer material in which the hologram may persistently be recorded and retained. A photopolymer may be used as the polymer material. In the photopolymer, the hologram is recorded by utilizing a change in a photoinduced refractive index upon polymerization of a photo-polymerizable monomer.

As described below, it is not necessary that the LED substrate 58 and the hologram recording layer 60 be in close contact with each other, and the LED substrate 58 and the hologram recording layer 60 may be a predetermined distance from each other with an air layer or a transparent resin layer interposed therebetween, as illustrated in FIGS. 3B and 3C. For example, the hologram recording layer 60 may be retained at a distance of a predetermined height from the LED substrate 58 by a retaining member (not illustrated).

As illustrated in FIGS. 3A and 3B, each of the holographic optical elements 54 is formed into a truncated-cone (an inverted frustum) shape that has a round flat base on the surface side of the hologram recording layer 60 and has sides that slope down toward the side of LED 50 from the base. Although the holographic optical element having the truncated-cone shape is described in the exemplary embodiment, the shape of the holographic optical element is not limited to the truncated cone. For example, a circular cone, an elliptic cone, and an elliptic frustum may be used as the shape of the holographic optical element. A diameter of the truncated-cone holographic optical element 54 is a maximum at the base. The diameter of the round flat base is set to a "hologram diameter $r_H$".

Each of the holographic optical elements 54 has a hologram diameter $r_H$ that is larger than the interval between LEDs 50 in the fast-scanning direction. For example, if the interval between LEDs 50 in the fast-scanning direction is 30 μm the hologram diameter $r_H$ may be 2 mm, and a hologram thickness $h_H$ may be 250 μm. Accordingly, as illustrated in FIGS. 2 and 3C, two holographic optical elements 54 adjacent to each other are formed so as to considerably overlap with each other.

Each of plural LEDs 50 is disposed on the LED substrate 58 such that a light-emitting surface of each LED 50 faces the surface side of the hologram recording layer 60, in order to emit the light toward the side of the corresponding holographic optical element 54. An "emission optical axis (optical axis of the light emitting device)" of an LED 50 faces a direction orthogonal to the LED substrate 58 and extends through the vicinity of the center (substantially along a symmetrical axis of the truncated cone) of the corresponding holographic optical element 54. As illustrated in FIGS. 2 and 3C, the emission optical axis is orthogonal to both the fast-scanning direction and the slow-scanning direction.

Various types of LED arrays may be used as the LED array 52. It is assumed that an SLED (Self-scanning LED) array is used in the exemplary embodiment. In the SLED array, plural SLED chips (not illustrated) in which plural SLEDs are one-dimensionally arrayed are disposed in a two-line staggered manner. In the SLED array, a switch is turned on and off by two signal lines to selectively emit light, and a data line is shared. The number of connecting lines on the substrate may be reduced by using an SLED array. When an SLED is used instead of an LED, the SLED may be referred to as "SLED 50", and may be designated by the same reference numeral as LED 50. The SLED chip may be referred to as "SLED chip 53" and may be designated by the same reference numeral as LED chip 53.

Although not illustrated, LPH 14 is mounted at a predetermined position of the image forming unit 11 and retained by a retaining member such as a housing or a holder such that the diffracted light produced by the holographic optical element 54 is output to the photosensitive drum 12. LPH 14 may be moved in an optical axis direction of the diffracted light by an adjustment unit such as an adjusting screw (not illustrated). The adjustment unit adjusts LPH 14 such that an image forming position (focal plane) of the holographic optical element 54 can be located on the surface of the photosensitive drum 12. A protective layer made of a material such as cover glass or transparent resin may be formed on the hologram recording layer 60. The protective layer prevents dust adhesion or the like.

Recording and Reconstruction of Hologram (Holographic Optical Element)

A principle of recording and reconstruction of the holographic optical element 54 will briefly be described. FIG. 4A is a view illustrating a state in which the holographic optical element is formed in the hologram recording layer. The illustration of the photosensitive drum 12 is omitted, and only the surface 12A which is the image forming plane is illustrated. The hologram recording layer 60A is a recording layer before the holographic optical element 54 is formed, and the hologram recording layer 60A is distinguished by the letter A from the hologram recording layer 60 in which the holographic optical element 54 has been formed.

As illustrated in FIG. 4A, the hologram recording layer 60A is irradiated with a signal beam (that is, an object beam), which is coherent light that passes through an optical path of the diffracted light and forms an image on the surface 12A. At the same time, the hologram recording layer 60A is irradiated with a reference beam, which is coherent light that passes through an optical path of diffusion light from an emitter (an emission point of a LED 50) that spreads to the desired hologram diameter $r_H$, when passing through the hologram recording layer 60A. A laser source such as a semiconductor laser is used in irradiating the hologram recording layer 60A with the coherent light.

The same side (the backside) of the hologram recording layer 60A is irradiated with the signal beam and the reference beam. The backside of the hologram recording layer 60A faces the side of the LED substrate 58. An interference fringe (intensity distribution) obtained by interference between the signal beam and the reference beam is recorded over a thickness direction of the hologram recording layer 60A, thereby obtaining a hologram recording layer 60 in which a transmission holographic optical element 54 is formed. The holographic optical element 54 is a volume hologram in which an intensity distribution of the interference fringe is recorded in a plane direction and a thickness direction. LPH 14 is produced by fixing the hologram recording layer 60 onto the LED substrate 58 on which the LED array 52 is mounted.

Although the surface 12A is schematically illustrated in FIG. 4A, it is in practice located significantly further away, since the hologram diameter $r_H$ is several millimeters wide while the operating distance L is several centimeters long. Therefore, the holographic optical element 54 is in practice not a conical shape as illustrated in FIG. 4A, but a truncated-cone shape as illustrated in FIG. 3A.

FIG. 4B is a view illustrating a state in which the holographic optical element is formed in the hologram recording layer as with FIG. 4A. Unlike the recording method of FIG. 4A, the surface side of the hologram recording layer 60A is irradiated with the signal beam and the reference beam. That is, the hologram is recorded by a phase conjugate wave. In this exemplary embodiment, the hologram is recorded by the phase conjugate wave in the hologram recording layer 60 formed on the LED substrate 58. Accordingly, the detailed recording method of FIG. 4B is described later.

Formation of Beam Spots in a Line

FIGS. 5A and 5B are views illustrating a state in which diffracted light is produced from the holographic optical element. When LED 50 emits light, the light emitted from LED 50 passes through an optical path of diffusion light that spreads from the emitter to the hologram diameter $r_H$. Light emission of the LED 50 generates substantially the same effect as when the holographic optical element 54 is irradiated with the reference beam. Owing to irradiation of the reference beam, a beam substantially identical to the signal beam is reconstructed from the holographic optical element 54 and is output as diffracted light. The output diffracted light converges on the surface 12A of the photosensitive drum 12 at an operating distance of several centimeters to form an image. A beam spot 62 is formed on the surface 12A. The volume hologram has a high incident angle selectivity and a high wavelength selectivity, and high diffraction efficiency is obtained. Therefore, background noise is reduced, and the signal beam accurately reconstructed to form a micro beam spot (light collecting point) having a clear outline on the surface 12A.

The light emitted from LED 50 provided on the first straight line and represented by LED $50_1$ is diffracted from the emission optical axis by an angle $\theta_1$, and the light emitted from LED 50 provided on the second straight line and represented by LED $50_2$ is diffracted from the emission optical axis by an angle $\theta_2$. The angles $\theta_1$ and $\theta_2$ formed between the emission optical axis and the diffracted light optical axis (optical axis of the diffracted light) are set such that the photosensitive drum 12 is located outside the optical path of the diffusion light spreading from the LED 50 to the hologram diameter $r_H$. Accordingly, even if the diffusion light is not diffracted by the hologram but transmitted through the hologram, the photosensitive drum 12 is not irradiated with the transmitted diffusion light as background light.

As illustrated in FIG. 2, the output diffracted light converges in the direction of the photosensitive drum 12 to form the image on the surface of the photosensitive drum 12 disposed on the focal plane at a distance of several centimeters. Beam spots $62_1$ to $62_6$ are formed on the surface 12A of the photosensitive drum 12 according to each of the holographic optical elements $54_1$ to $54_6$. The plural LED chips $53_1$ and $53_2$ are arrayed in a staggered manner, and the plural LEDs 50 are distributed in the slow-scanning direction; further, when the angles $\theta_1$ and $\theta_2$ are appropriately set according to the position of the LED chips in the slow-scanning direction, the beam spots $62_1$ to $62_6$ can be formed in a line in the fast-scanning direction even if the plural LEDs in each LED chip do not emit light at mutually different times. The beam spots $62_1$ to $62_6$ are collectively referred to as "beam spot 62" unless expressly stated otherwise.

In FIG. 2, the six LEDs $50_1$ to $50_6$ are arrayed in two LED chips 53 with three LEDs 50 mounted in each chip. Alternatively, the LED chip 53 may include four or more LEDs 50, and three or more LED chips 53 may be arranged. In an actual image forming apparatus, several thousands of LEDs are arrayed in the fast-scanning direction according to a desired resolution.

For example, in FIG. 2, it is assumed that 58 SLED chips in which 128 SLEDs are mounted at an interval of 1200 spi (spots per inch), are arrayed in series to form the SLED array in which SLEDs are arranged in lines along the fast-scanning direction. Based on this assumption, 7424 SLEDs are arrayed at intervals of 21 μm in the image forming apparatus having a resolution of 1200 dpi. Assuming that all the SLEDs are used as the emitters, 7424 beam spots 62 corresponding to 7424 SLEDs are formed in a line in the fast-scanning direction on the photosensitive drum 12.

In FIG. 2, for the purpose of convenience, plural LEDs 50 are arrayed in two lines. In the exemplary embodiment, as described later, the position and the luminous intensity (the intensity of light emission) of each LED 50 are measured, and a part of the LEDs 50 are selected as the "emitter (emission point)" based on the measurement values. As used herein, the "emitter" means a light-emitting element that is selected to be used as the light source. Based on the measurement values of the selected parts of LEDs 50, the holographic optical element 54 is formed in a previously designated position. Because the hologram is recorded according to the position of the emitter used, either a one-dimensional array or a two-dimensional array may be adopted in the LED array 52, and positional deviation of LED 50 or the LED chip 53 can be also compensated for.

Dimensions of Holographic Optical Element

In the image forming apparatus having a resolution of 1200 dpi, 7424 SLEDs are arrayed at intervals of 21 μm. When a beam spot is formed by converging light through a converging lens, a minimum size limit of the micro beam spot is determined by a light diffraction phenomenon. The beam spot formed by the converging lens is known as an Airy disc according to the following relational expression. A diameter (beam spot size) $\phi$ of the Airy disc is expressed by $\phi=1.222\lambda/NA$ ($=2.44\lambda F$) using a wavelength $\lambda$ and Numerical Aperture NA of the converging lens. Accordingly, assuming that f is the operating distance ($\approx$focal distance), $f=r_H\phi/2.44\lambda$ is obtained.

$NA=\sin\theta=r_H/2f$ $F\text{(F number)}=f/r_H$ f: focal distance $f=r_H\phi/2.44\lambda$ In an LPH in which a conventional holographic optical element array is used, each of plural holographic optical elements is prepared with a diameter equal to or less than a pitch of plural light-emitting devices (an LED pitch) such that the holographic optical elements do not overlap each other, similar to the case in which each of plural lenses is arrayed corresponding to LEDs. The LED pitch is substantially equal to an interval (pixel pitch) between the micro beam spots formed on the photosensitive drum, and the LED pitch is tens of micrometers. In a holographic optical element whose diameter is tens of micrometers, as with a rod lens, only an operating distance in the order of magnitude of several millimeters is obtained, owing to beam expansion caused by diffraction (that is, it is limited by diffraction). On the other hand, in the exemplary embodiment, the diameter of the holographic optical element is larger than the LED pitch, thereby realizing an operating distance in the order of magnitude of centimeters.

For example, when the diameter of the holographic optical element is set equal to or less than the LED pitch as is conventionally done, it is necessary to set the hologram size $r_H$ to about 20 μm or less at a resolution of 1200 dpi. At this point, when the wavelength is set to 780 nm, the operating distance is limited to at most 420 μm even if the beam spot size $\phi$ is permitted to be enlarged to about 40 μm. In the conventional technique, it is difficult to lengthen the operating distance to the order of magnitude of centimeters.

On the other hand, in the exemplary embodiment, when the diameter of the holographic optical element increases to be greater than the LED pitch, the operating distance is lengthened to the order of magnitude of centimeters. For example, the operating distance is lengthened to 1 cm or more when the diameter (hologram diameter $r_H$) of the holographic optical element 54 that acts as the converging lens is set to 1 mm or more. For example, assuming hologram diameter $r_H=2$ mm and hologram thickness $h_H=250$ μm, beam spot size $\phi$ becomes about 40 μm (about 30 μm in terms of half-value width) at an operating distance of 4 cm.

When the diameter of the holographic optical element exceeds 10 mm, because a multiplicity of the holographic optical elements increases greatly, diffraction efficiency, which is limited by a dynamic range of the material, decreases. Accordingly, the diameter of the holographic optical element may be set to 10 mm or less according to the dynamic range of the material.

Outline of LPH Producing Method

An example of a method for producing LPH 14 will be described. An alignment inspection step and a hologram recording step will be described in more detail below as a procedure of a "selective hologram formation" along with a configuration of a hologram recording apparatus. FIGS. 6A to 6E are views illustrating the steps of an LED printhead producing process. The outline of the LED printhead producing process is described above as the principle of recording and reconstruction of the holographic optical element 54. At this point, although only one LED 50 and one holographic optical element 54 are illustrated since the figure is a sectional view in the slow-scanning direction, the description of the process relates to producing an LPH 14 that includes the LED array 52 and the holographic optical element array 56.

As illustrated in FIG. 6A, plural LEDs 50 are arrayed in each of plural LED chips 53, and the LED array 52 mounted on the LED substrate 58 is thereby prepared. A mound portion 64 is formed into a frame shape at a peripheral portion on the surface of the LED substrate 58 in order to dam the photopolymer. For example, the mound portion 64 may be formed by applying a curable polymer having substantially the same thickness as the hologram recording layer 60 and curing the curable polymer by irradiating it with heat or light. When a thin volume hologram is recorded, the hologram recording layer 60 has a thickness of hundreds of micrometers, and the mound portion 64 is formed having a thickness of hundreds micrometers. When a thick volume hologram is recorded, the hologram recording layer 60 has a thickness of 1 mm to 10 mm, and the mound portion 64 is formed having a thickness of 1 mm to 10 mm.

As illustrated in FIG. 6B, the photopolymer is caused to flow from a dispenser onto the LED substrate 58 at a periphery of which is formed the frame shaped mound portion 64, to an extent that the photopolymer does not overflow from the mound portion 64, thereby forming the hologram recording layer 60A. Then, a thin cover glass that is transparent to recording (writing) light and reconstruction (reading) light is mounted on the surface of the hologram recording layer 60A to form the protective layer 66 on the hologram recording layer 60A. Subsequently, chip alignment inspection is performed to measure the position and luminous intensity of each of the plural LEDs 50.

As illustrated in FIG. 6C, the hologram recording layer 60A made of the photopolymer is simultaneously irradiated with the signal beam and the reference beam from the side of the protective layer 66 to form the plural holographic optical elements 54 in the hologram recording layer 60A. The hologram recording layer 60A is irradiated with the signal beam, which is a laser beam passing reversely through the optical path of the desired diffracted light. The hologram recording layer 60A is irradiated with the reference beam, which is a laser beam passing through the optical path of the convergent light that converges from the desired hologram diameter $r_H$ to the emission point (emitter) when passing through the hologram recording layer 60A. That is, as illustrated in FIG. 4B, the hologram is recorded by phase conjugate waves. A laser beam having a wavelength of 780 nm emitted from a semiconductor laser may be used as the laser beams for the signal beam and the reference beam.

LEDs 50 used as the emitters are selected based on the measurement data obtained by the chip alignment inspection. Properties of the signal beam and reference beam, such as an irradiation position, an irradiation angle, a spread angle, and a convergent angle, are set in each selected LED 50 according to the measurement data and design values (predetermined parameters such as a hologram diameter $r_H$ and a hologram thickness $h_H$) of the holographic optical element 54. At this point, the signal beam is set in each selected LED 50 such that spots 62, each of which is formed from diffracted light (a reconstructed signal beam) produced by the hologram element 54, are formed in a line at predetermined intervals on the photosensitive drum 12. A recording optical system for irradiation of the hologram recording layer 60A with the designed signal beam and reference beam is disposed in each selected LED 50.

The LED substrate 58 in which the hologram recording layer 60A is formed is moved with respect to the optical system that irradiates the hologram recording layer 60A with the reference beam. The LED substrate 58 is moved to a predetermined position such that the reference beam converges sequentially on each selected LED 50. An optical system that irradiates the hologram recording layer 60A with the signal beam is disposed in each position of the LED substrate 58 such that a reconstructed signal beam forms a beam spot 62 in a desired position on the surface of the photosensitive drum 12. The hologram recording layer 60A is irradiated at each position of the LED substrate 58 in accordance with the signal beam and the reference beam of the LEDs 50, and the plural holographic optical elements 54 are plurally-recorded in the hologram recording layer 60A by shift multiplexing with a spherical wave.

As illustrated in FIG. 6D, flood exposure of the hologram recording layer 60A is performed with UV (ultraviolet) irradiation to polymerize the whole of the photo-polymerizable monomer. A refractive index profile (refractivity distribution) is fixed to the hologram recording layer 60A by the fixing step. The photopolymer may be a mixture of the photo-polymerizable monomer and another non-polymerizable compound. In such cases, when the photopolymer is irradiated with an interference fringe, the photo-polymerizable monomer is polymerized at a bright portion, and a concentration gradient of the photo-polymerizable monomer is generated. As a result, the photo-polymerizable monomer diffuses in the bright portion, and a difference in refractive index is generated between the bright portion and the dark portion.

The photo-polymerizable monomer remaining in the dark portion is polymerized by the further flood exposure to complete the polymerization reaction, and thereby, re-recording (that is, rewriting or overwriting) or erasing becomes substantially impossible in the hologram recording layer 60A. Materials for holographic memory have been proposed based on various recording mechanisms. A material in which a refractive index profile (refractivity modulation) is recorded according to a luminous intensity profile (light intensity distribution) may be used.

As illustrated in FIG. 6E, the plural LEDs 50 are sequentially turned on and emit light to inspect whether the desired diffracted light is obtained by the holographic optical element 54 that is formed according to each LED 50. All steps of the producing process end after the inspection step.

In the producing process, an LED 50 and the hologram recording layer 60 are in contact with each other. Alternatively, as illustrated in FIGS. 3B and 3C, the hologram recording layer 60 may be separated from an LED 50 and an air layer or transparent resin layer may be interposed therebetween. In this case, a sheet including an unrecorded hologram recording layer 60A sandwiched between protective layers may separately be prepared and disposed on a light-emitting device array.

Selective Formation of Hologram

Figure 7:
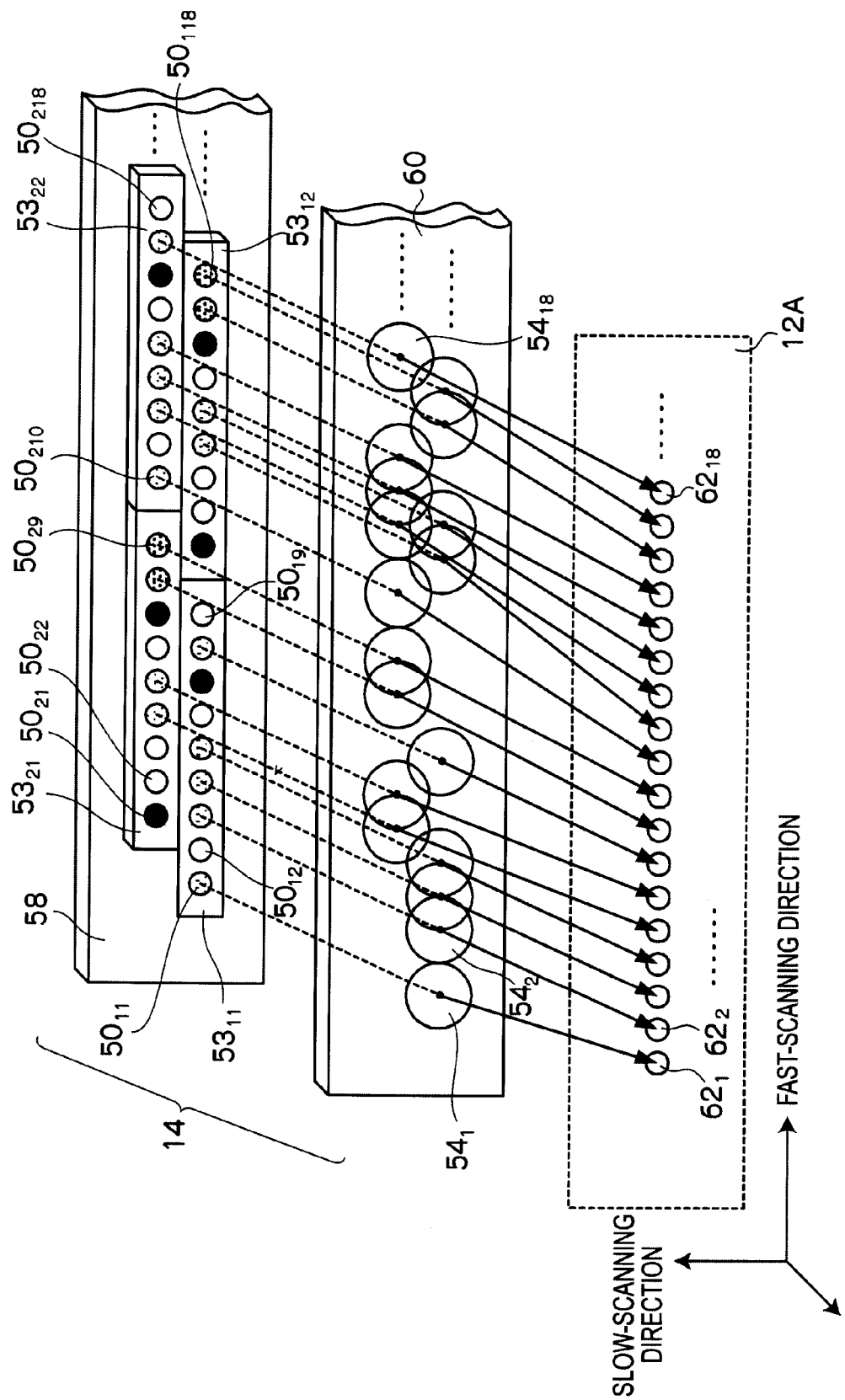
FIG. 7 is an exploded perspective view illustrating an example of a configuration of the LED printhead in which holograms are formed according to a selected portion of LEDs.

The "selective formation of hologram" in which the holographic optical element 54 is formed according to the selected portion of LEDs 50 will be described below. FIG. 7 is an exploded perspective view illustrating an example of a partial configuration of an LPH in which a hologram is formed according to the selected portion of LEDs. In the exploded perspective view of FIG. 7, the configuration of the LPH schematically illustrated in FIG. 2 is illustrated more specifically, and the configuration of LPH of FIG. 7 is closer to the configuration of LPH used in the actual image forming apparatus.

In the exemplary embodiment, LPH 14 includes the LED substrate 58 on which the LED array 52 is mounted and the hologram recording layer 60 in which the plural holographic optical elements 54 are formed. The LED array 52 is the SLED array in which the plural SLED chips 53 are disposed in the two-line staggered manner. As described above, several thousands of LEDs are mounted in LPH 14 of the actual image forming apparatus according to the resolution in the fast-scanning direction.

In the exploded perspective view of FIG. 7, a part of LPH 14 closer to the actual configuration in which four SLED chips $53_{11}$ to $53_{22}$ are disposed in the two-line staggered manner is illustrated. "SLED chip $53_{mn}$" indicates the SLED chip 53 that is disposed in the m-th row and the n-th column. In each of the four SLED chips $53_{11}$ to $53_{22}$, nine SLEDs 50 are one-dimensionally arrayed at predetermined intervals. Each of the four SLED chips $53_{11}$ to $53_{22}$ is disposed such that the array direction of the SLEDs 50 is oriented in the fast-scanning direction.

That is, the SLED chip $53_{11}$ and the SLED chip $53_{12}$ are disposed so as to be adjacent to each other in the first row of the LED array 52, and the SLED chip $53_{21}$ and the SLED chip $53_{22}$ are disposed so as to be adjacent to each other in the second row of the LED array 52. "SLED $50_{mn}$" indicates a SLED that is disposed in the m-th row and the n-th column. Accordingly, FIG. 7 illustrates a total of 36 SLEDs 50 (SLED $50_{11}$ to $50_{218}$) arrayed in two rows and 18 columns.

The SLED chip $53_{11}$ in the first row and the SLED chip $53_{21}$ in the second row are disposed such that SLED $50_{13}$ in the third column of the SLED chip $53_{11}$ in the first row and the SLED $50_{21}$ in the first column of the SLED chip $53_{21}$ in the second row are aligned in the slow-scanning direction; that is, the SLED chip 53 in the first row and the SLED chip 53 in the second row are disposed offset by two columns in the fast-scanning direction (that is, in the staggered manner).

In the exemplary embodiment, as described in the method for producing LPH 14, the position and luminous intensity of each SLED 50 are measured, and a portion of SLEDs 50 are selected as emitters based on the measurement values. For example, in FIG. 7, the SLEDs 50 indicated with black circles are defective devices. In this case, other SLEDs 50 are selected as the emitters such that defective elements are not used. A specific example of the emitter selecting method is described later.

In LPH 14 of the actual image forming apparatus, several thousands of beam spots 62 are arrayed at predetermined intervals in the surface 12A of the photosensitive drum 12 according to the resolution in the fast-scanning direction. In FIG. 7, the 18 beam spots $62_1$ to $62_{18}$ are formed at predetermined intervals in the surface 12A. Accordingly, 18 SLEDs 50 are selected from 36 SLEDs 50 according to the 18 beam spots 62. In FIG. 7, only 18 SLEDs 50 are used among the 36 SLEDs 50 of the SLED array. In other words, a light source array having a high defect rate (in FIG. 7, a defect rate of 50%) may be used.

The 18 holographic optical elements $54_1$ to $54_{18}$ having previously-designed shapes are formed in predetermined positions such that the 18 beam spots $62_1$ to $62_{18}$ are formed according to the selected 18 SLEDs 50. That is, the LED array 52 includes an excess of SLEDs 50, and a holographic optical element 54 is not formed for each of the SLEDs 50 included in the LED array 52; instead, the plural holographic optical elements 54 are selectively formed according to the selected portion of SLEDs 50.

Hologram Recording Apparatus

Figure 8:
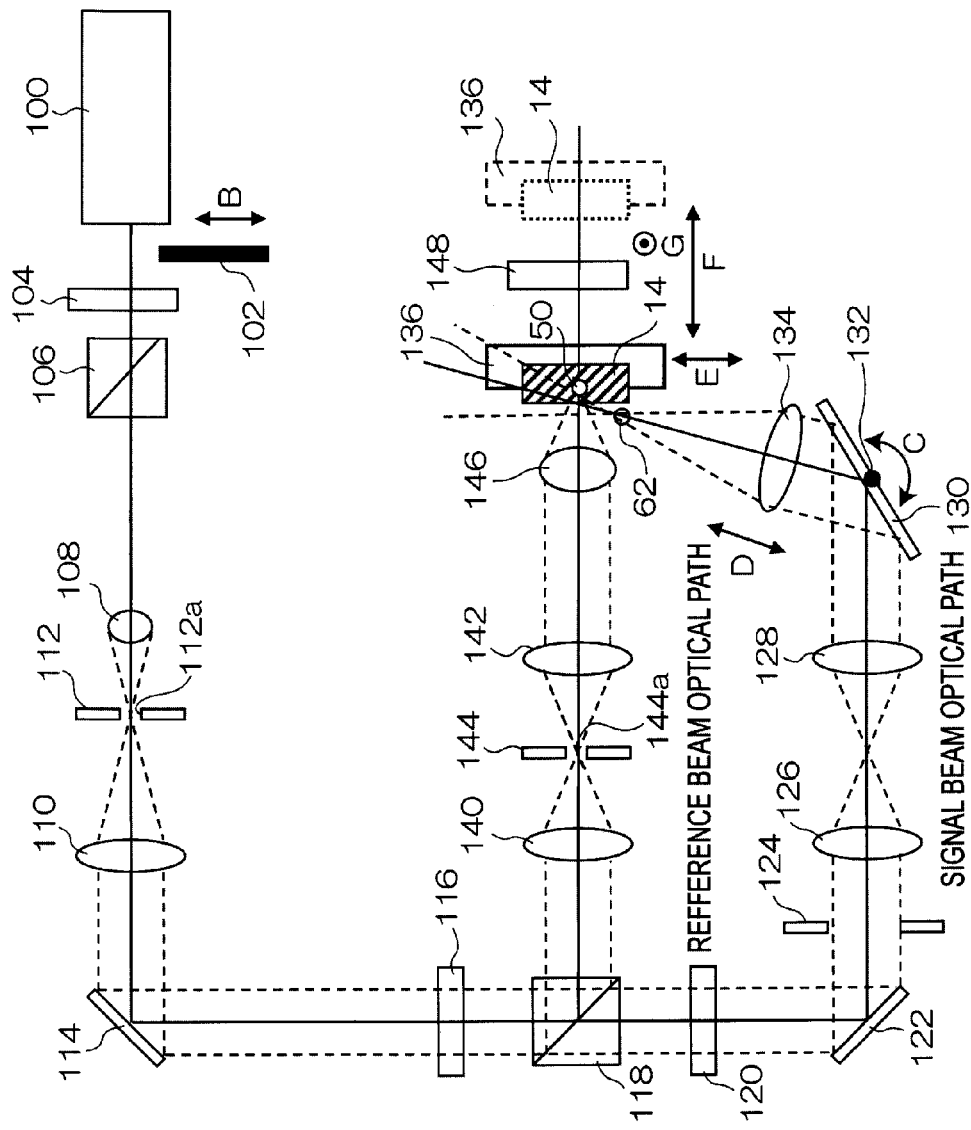
FIG. 8 is a schematic diagram illustrating an example of a configuration of a hologram recording apparatus according to an exemplary embodiment of the invention.

FIG. 8 is a schematic diagram illustrating an example of a configuration of a hologram recording apparatus according to an exemplary embodiment of the invention. As illustrated in FIG. 8, a laser (light) source 100 is provided in the hologram recording apparatus, and the laser source 100 emits a laser beam that is of coherent light.

A shutter 102, a half-wave plate 104, and a polarization beam splitter 106 are sequentially disposed along the laser beam optical path at the light output side of the laser source 100. The shutter 102 is configured to be able to be opened and closed. The half-wave plate 104 imparts a phase difference of a half wavelength to linearly polarized lights (linear polarization components) orthogonal to each other. The polarization beam splitter 106 transmits only light polarized in a predetermined direction while reflecting other polarized light. The shutter 102 is connected to a shutter driving section (described below). The shutter 102 is driven in a direction of an arrow B by the shutter driving section such that the shutter 102 enters the laser beam optical path (closed state) or such that the shutter 102 is retracted from the optical path (opened state).

An optical absorber (not illustrated) that absorbs the reflected laser beam is disposed on the light reflection side of the polarization beam splitter 106. A pair of lenses 108 and 110 is sequentially disposed along the laser beam optical path on the light transmission side of the polarization beam splitter 106. The pair of lenses 108 and 110 are formed by a combination of two lenses such that focal positions of the lenses are matched with each other, and the lenses 108 and 110 act as a beam expander that expands the beam diameter of the laser beam. A spatial filter 112 including a pinhole (micro aperture) 112a is disposed in focal planes of the lenses 108 and 110.

A mirror 114 is disposed on the light output side of the lens 110, and the mirror 114 reflects the transmitted laser beam to bend the optical path by a predetermined angle. In FIG. 8, the mirror 114 bends the incident light optical path by 90°. A half-wave plate 116 and a polarization beam splitter 118 are sequentially disposed along the laser beam optical path on the light output side of the mirror 114. The polarization beam splitter 118 divides the laser beam into two beams for off-axis holography. The polarization beam splitter 118 branches the laser beam optical path into a signal beam optical path and a reference beam optical path.

A half-wave plate 120, a mirror 122, and an aperture stop 124 are sequentially disposed along the laser beam optical path on the light transmission side (that is, signal beam optical path side) of the polarization beam splitter 118. The aperture stop 124 is a light shielding plate that includes an aperture having a predetermined diameter through which the laser beam passes. In FIG. 8, the optical path of the laser beam transmitted through the half-wave plate 120 is bent by 90° by the mirror 122. The laser beam reflected by the mirror 122 is incident on the aperture stop 124.

A pair of lenses 126 and 128, a rotary mirror 130, a lens 134, and a stage 136 are sequentially disposed along the laser beam optical path on the light transmission side of the aperture stop 124. The rotary mirror 130 reflects the laser beam to bend the optical path by an arbitrary angle (that is, by a desired angle). (The unrecorded hologram recording layer 60A of) LPH 14 is irradiated with the signal beam through the lens 134 during the recording. The stage 136 retains LPH 14 in a predetermined position. As described later, the stage 136 retains LPH 14 in a recording position illustrated by a solid line during recording the hologram, and the stage 136 retains LPH 14 in a measurement position illustrated by a dotted line during the measurement.

The rotary mirror 130 is connected to a mirror driving section (described later). The rotary mirror 130 is driven by the mirror driving section, and the rotary mirror 130 is rotated on its rotating axis 132 as illustrated by an arrow C to bend the optical path by an arbitrary angle. The lens 134 is connected to a lens driving section (described later). The lens 134 is driven by the lens driving section, and the lens 134 is moved in a direction of an arrow D to change a focal position corresponding to the forming position of the beam spot 62. The stage 136 is connected to a stage driving section (described later). The stage 136 is driven by the stage driving section, and the stage 136 is moved in a direction of an arrow E and a direction of an arrow F.

A pair of lenses 140 and 142 is sequentially disposed along the laser beam optical path on the light reflection side of the polarization beam splitter 118. The pair of lenses 140 and 142 is formed by a combination of two lenses such that focal positions of the lenses are matched with each other. A spatial filter 144 including a pinhole (micro aperture) 144a is disposed on the focal planes of the lenses 140 and 142. A lens 146 is disposed on the light output side of the lens 142, and LPH 14 is irradiated with the reference beam through the lens 146. The LPH 14 retained by the stage 136 is moved in the directions of the arrow E and arrow F such that the stage 136 is driven by the stage driving section to converge the reference beam onto LED 50.

LPH 14 is retained in the measurement position illustrated by the dotted line during the measurement. A scanner 148 is disposed on a measured surface side of LPH 14 in the measurement position, and the scanner 148 measures the position and luminous intensity of each one of LEDs 50 constituting the LED array 52 of LPH 14. For example, a reading device such as a CCD scanner may be used as the scanner 148. The scanner 148 is driven by a scanner driving section, and the scanner 148 sequentially measures the position and luminous intensity of each of the plural LEDs 50 arrayed along the length direction of LPH 14 while moving in the length direction of the LED substrate 58 which extends in a depth direction (direction of an arrow G) of the drawing.

Figure 9:
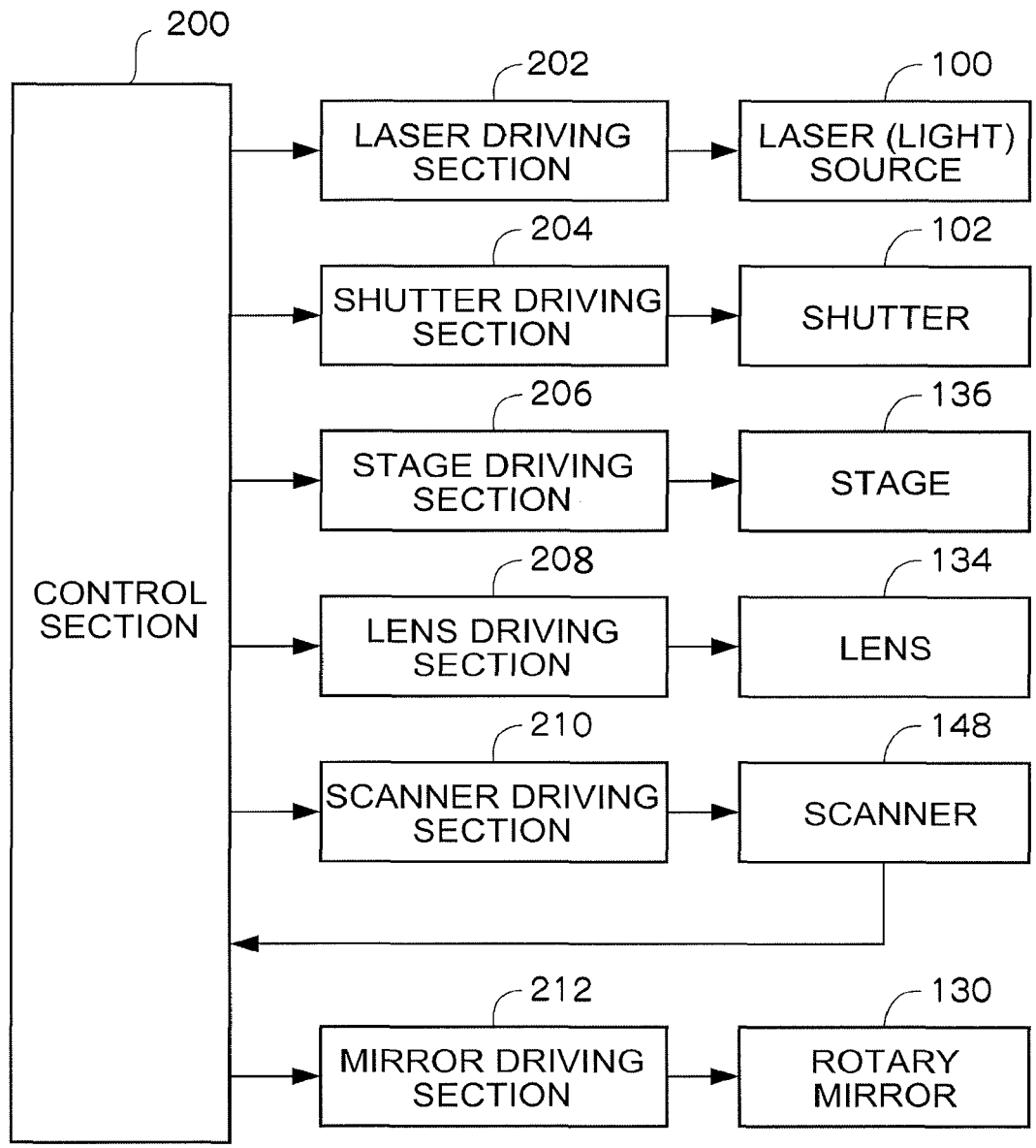
FIG. 9 is a block diagram illustrating a configuration of a driving/control system of the hologram recording apparatus of FIG. 8.

An electrical configuration of the hologram recording apparatus will be described. FIG. 9 is a block diagram illustrating a configuration of a driving/control system of the hologram recording apparatus of FIG. 8. The hologram recording apparatus, as illustrated in FIG. 9, includes a control section 200 that controls the whole of the apparatus. A laser driving section (driving circuit) 202 is connected to the control section 200, and the laser driving section 202 drives the laser source 100 in response to a control signal. A shutter driving section 204 is connected to the control section 200, and the shutter driving section 204 opens and closes the shutter 102 in response to the control signal.

A stage driving section 206 is connected to the control section 200, and the stage driving section 206 drives the stage 136 in response to the control signal. A driving circuit (not illustrated) is mounted on the LED substrate 58 of LPH 14 retained by the stage 136. The stage driving section 206 is also connected to the driving circuit to drive LEDs 50 formed on the LED substrate 58 respectively.

A lens driving section 208 is connected to the control section 200, and the lens driving section 208 moves the lens 134 in response to the control signal. A scanner driving section 210 is connected to the control section 200, and the scanner driving section 210 drives the scanner 148 in response to the control signal. The control section 200 obtains the measurement signal from the scanner 148. A mirror driving section 212 is connected to the control section 200, and the mirror driving section 212 rotates the rotary mirror 130 in response to the control signal.

The control section 200 includes a CPU (Central Processing Unit) that performs the control of each unit of the apparatus and various operations, a ROM in which various programs such as an OS are stored, and a RAM that is used as a work area in executing the program. The control section 200 may include an external storage device such as a hard disk in which various pieces of information are stored, an input/output port, a communication interface, and various drives. The units included in the control section 200 are connected to one another through a bus. The CPU reads the program from the ROM or the storage device such as the external storage device to load the program to the RAM. The CPU executes the loaded program using the RAM as a work area.

The "selective hologram forming program" (described later) is stored in the ROM or the external storage device. A positional coordinate of the beam spot 62 is previously stored as a design value in the ROM or the storage device such as the external storage device.

Outline of Hologram Recording Operation

A recording operation of the hologram recording apparatus will be described with reference to FIGS. 8 and 9. Operations, such as the alignment inspection, which are performed before the hologram is recorded are described in detail below. In recording the hologram, the shutter driving section 204 drives the shutter 102 such that the shutter 102 is in the "opened state". The laser driving section 202 drives the laser source 100 such that the laser source 100 emits the laser beam having a predetermined wavelength (that is, the laser oscillation is caused). The laser beam emitted from the laser source 100 passes through the half-wave plate 104 to impart a phase difference of the half wavelength to the linearly polarized lights (linear polarization components) orthogonal to each other, and the laser beam is incident on the polarization beam splitter 106. The polarization beam splitter 106 may transmit one of P-polarization or S-polarization while reflecting the other.

The pair of lenses 108 and 110 that acts as the beam expander expands the beam diameter of the linearly polarized light in the predetermined direction, which has been transmitted through the polarization beam splitter 106. The spatial filter 112 that is disposed on the focal planes of the lenses 108 and 110 cuts off a part of the laser beam that cannot pass through the pinhole 112*a*. The laser beam passing through the pinhole 112*a* is collimated by the lens 110, and the laser beam is reflected by the mirror 114 to bend the laser beam optical path by 90°.

The laser beam reflected by the mirror 114 passes through the half-wave plate 116, and the laser beam is incident on the polarization beam splitter 118. The laser beam transmitted through the polarization beam splitter 118 passes through the half-wave plate 120, and the laser beam is reflected by the mirror 122, and the aperture stop 124 imparts a predetermined beam diameter to the laser beam according to the aperture diameter. The stage driving section 206 drives the stage 136, and the stage 136 retains LPH 14 in the predetermined recording position. The laser beam passing through the aperture stop 124 is relayed by the pair of lenses 126 and 128 and reflected in the predetermined direction by the rotary mirror 130. The laser beam reflected by the rotary mirror 130 is converged by the lens 134, and LPH 14 is irradiated with the laser beam as the signal beam.

On the other hand, the laser beam reflected by the polarization beam splitter 118 is relayed by the pair of lenses 140 and 142. The spatial filter 144 that is disposed on the focal planes of the lenses 140 and 142 cuts off part of the laser beam that cannot pass through the pinhole 144*a*. The laser beam passing through the pinhole 144*a* is collimated by the lens 142, the laser beam is converged by the lens 146, and LPH 14 is irradiated with the laser beam as the reference beam.

As described above, the signal beam and the reference beam are produced by branching the laser beam emitted from the same laser source 100. The same position of LPH 14 is simultaneously irradiated with the signal beam and the reference beam from the same side. Therefore, the signal beam and the reference beam interfere with each other in the hologram recording layer 60A of LPH 14 (that is, holographic interference occurs), and the interference pattern (that is, an interference fringe) is recorded as the hologram. "The same position of LPH 14" means substantially the same position within a range necessary to record one hologram.

Selective Hologram Forming Program

Figure 10:
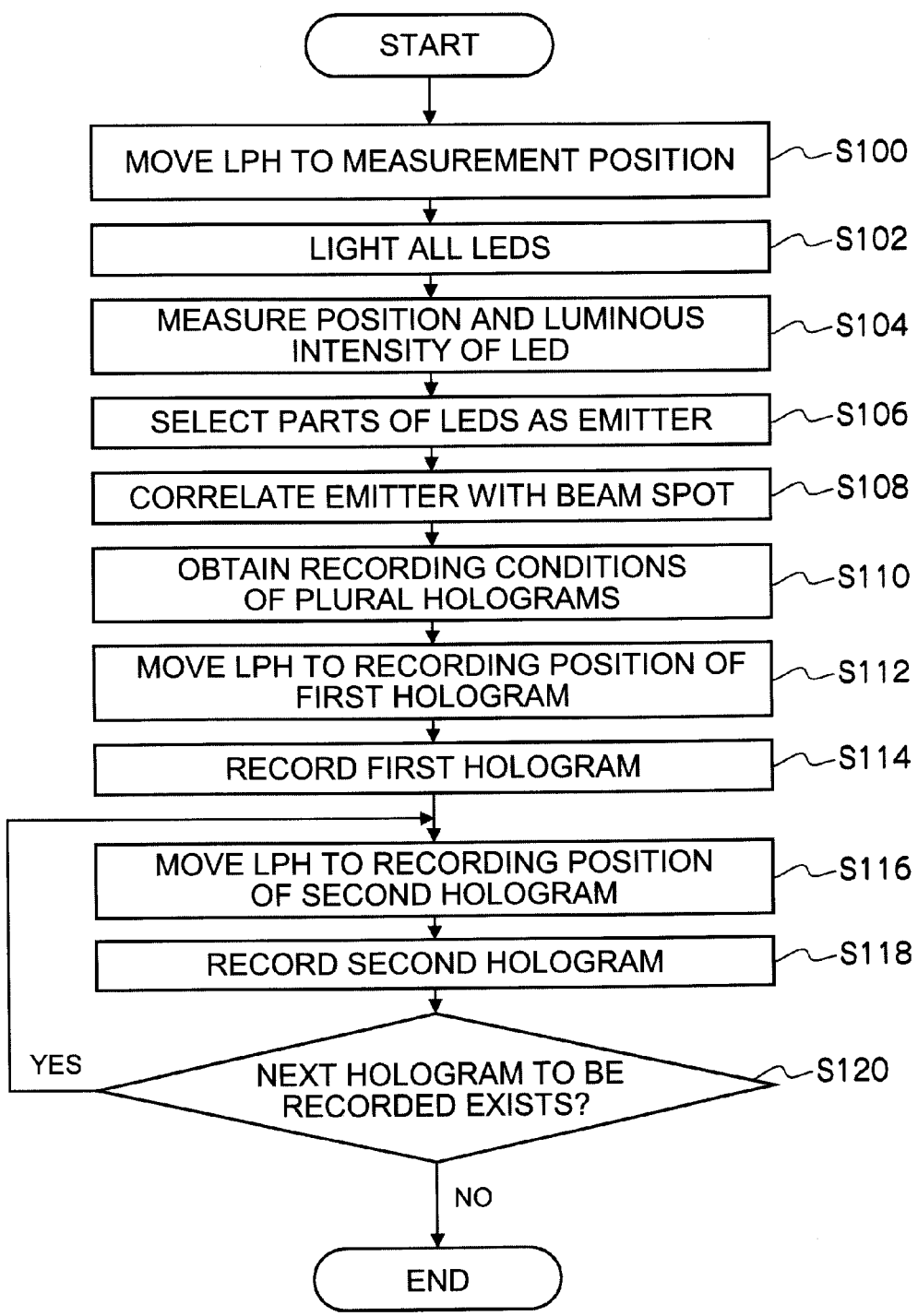
FIG. 10 is a flowchart illustrating a processing routine of a selective hologram forming program.

In the exemplary embodiment, the position and luminous intensity of each of SLEDs 50 are measured, and a portion of the SLEDs 50 are selected as emitters based on the measurement values. The plural holographic optical elements 54 are selectively formed such that the beam spots 62 are formed in a line according to the selected SLEDs 50. A processing procedure of the "selective hologram forming program" performed by the control section 200 will be described below. FIG. 10 is a flowchart illustrating a processing routine of the selective hologram forming program. The hologram is formed selectively by performing the processing routine.

In Step 100, control signals are sent to the stage driving section 206 and the scanner driving section 210 to move LPH 14 to the measurement position. In response to the control signals, the stage driving section 206 drives the stage 136 to retain LPH 14 in the measurement position illustrated by the dotted line, and the scanner driving section 210 moves the scanner 148 to an initial position.

In Step 102, a control signal is sent to the stage driving section 206 to light (that is, turn on) all LEDs 50. In response to the control signal, the driving circuit (not illustrated) of the LED substrate 58 connected to the stage driving section 206 simultaneously lights all LEDs 50 mounted on the LED substrate 58 of LPH 14 for the purpose of the measurement.

In Step 104, a control signal is sent to the scanner driving section 210 to measure the position and luminous intensity of each LED 50. In response to the control signal, the scanner 148 driven by the scanner driving section 210 sequentially measures the position and luminous intensity of each of the plural LEDs 50 arrayed along the length direction of LPH 14 while moving in the length direction of the LED substrate 58. The values measured by the scanner 148 (that is, the measurement data) are fed into the control section 200 and stored in a predetermined storage device. The stored measurement values are appropriately read and used in the process described below.

Figure 11:
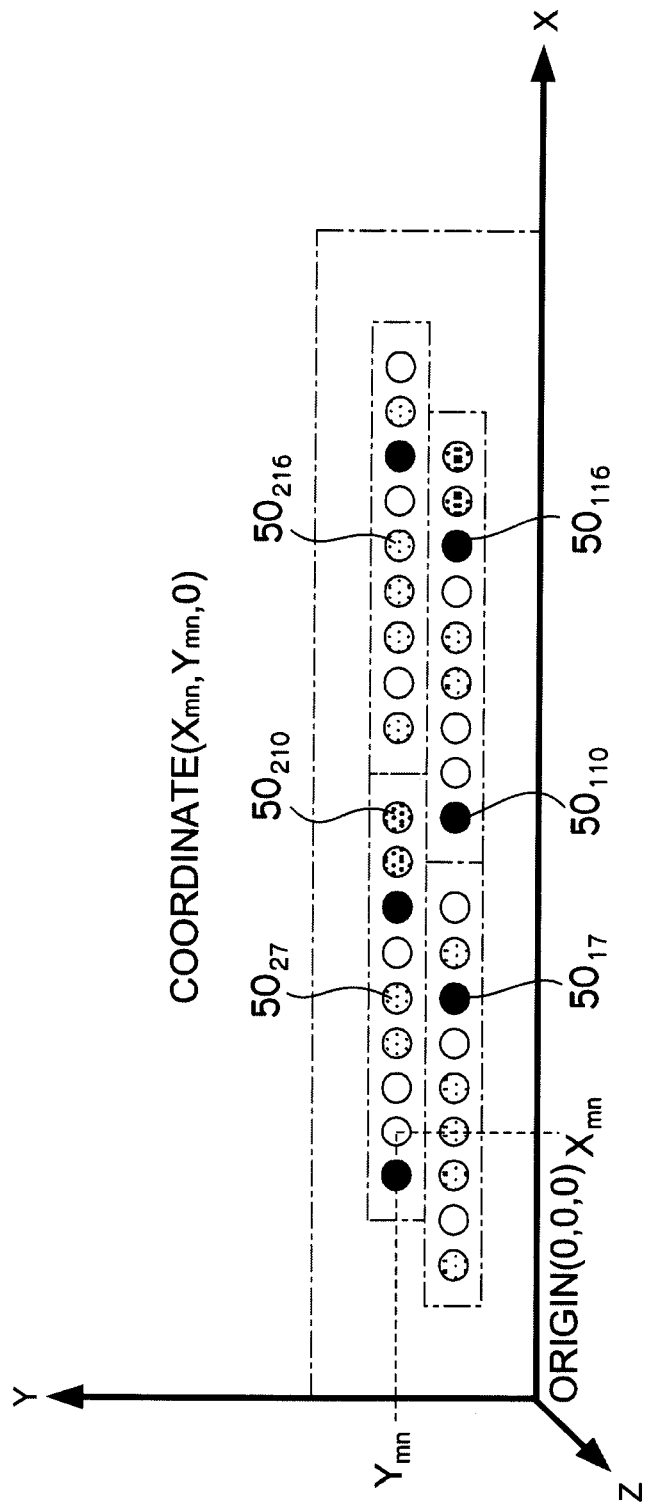
FIG. 11 illustrates a measurement result of a scanner.

In Step 106, a portion of SLEDs 50 are selected as emitters based on the measurement values of the scanner 148. A number of SLEDs 50 identical to the number of necessary beam spots 62 is selected. An example of the emitter selecting method will be described. FIG. 11 illustrates a measurement result of the scanner. The position of LED 50, which is a light-emitting device, is expressed by a coordinate (X,Y,Z) in an XYZ three-dimensional (spatial) coordinate system. An X-axis direction corresponds to the fast-scanning direction, a Y-axis direction corresponds to the slow-scanning direction, and a Z-axis direction corresponds to the optical axis direction of LED 50. One corner of the LED substrate 58 corresponds to an origin (0,0,0). In the spatial coordinate system, the state in which LPH 14 is retained in the measurement position (state of Z=0) corresponds to the state in which LPH 14 is disposed as the exposure apparatus around the photosensitive drum 12 (see FIG. 1).

Figure 12:
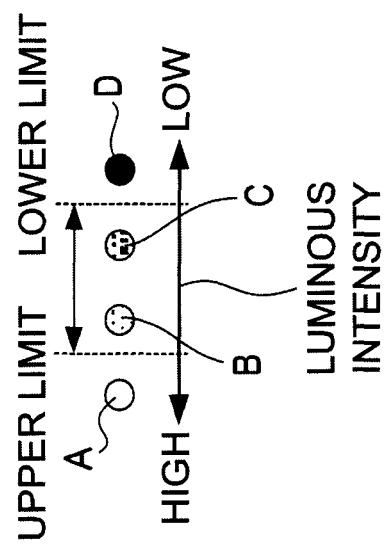
FIG. 12 illustrates strong and weak luminous intensity.

FIG. 12 illustrates strong and weak luminous intensity. The luminous intensity of an SLED 50 is obtained as a specific measurement value. At this point, for the sake of convenience, the luminous intensity of SLED 50 is illustrated in FIG. 12 divided into four levels A, B, C, and D ranked in descending order. The white circle expresses the A rank having the highest luminous intensity, and the black circle expresses the D rank having the lowest luminous intensity or non-emission. The B rank and the C rank located between the A rank and the D rank are expressed by halftones.

A preferable range of luminous intensity may be provided between the A rank and the D rank. For example, an upper limit of the preferable range of luminous intensity may be located between the A rank and the B rank and a lower limit may be located between the C rank and the D rank. In this case, the B rank and the C rank are equal to or greater than the lower limit and equal to or less than the upper limit, that is, the B rank and the C rank are located within the preferable range of luminous intensity, and a variation in luminous intensity may be reduced by using this range.

In the exploded perspective view of FIG. 7, 4 SLED chips 53$_{11}$ to 53$_{22}$, each having 9 SLEDs 50 arrayed therein, are disposed in the staggered manner on the LED substrate 58, and 36 SLEDs 50$_{11}$ to 50$_{218}$ are arrayed in 2 rows and 18 columns. FIG. 11 illustrates the measurement result of the LED array of FIG. 7. The values measured in each SLED 50 by the scanner 148 are stored in the predetermined storage device, for example, in the form of Table 1 given below.

TABLE 1

| Light-emitting device number ($50_{mn}$) | Luminous intensity (rank) | Position of emitter (coordinates) |
| --- | --- | --- |
| $50_{11}$ | B | $(X_{11}, Y_{11}, 0)$ |
| $50_{12}$ | A | $(X_{12}, Y_{12}, 0)$ |
| . | | |
| . | | |
| . | | |
| $50_{118}$ | C | $(X_{118}, Y_{118}, 0)$ |
| $50_{21}$ | D | $(X_{21}, Y_{21}, 0)$ |
| $50_{22}$ | A | $(X_{22}, Y_{22}, 0)$ |
| . | . | . |
| . | . | . |
| . | . | . |
| $50_{218}$ | A | $(X_{218}, Y_{218}, 0)$ |

A method in which the B-rank and C-rank SLEDs 50 located in the preferable range of luminous intensity are selected is an example of the emitter selecting method. In FIG. 7, the 18 holographic optical elements 54 are formed according to the 18 SLEDs 50 selected by the method of selecting the B-rank and C-rank SLEDs 50 located in the preferable range of luminous intensity. A method in which the desired number of SLEDs 50 are selected in descending order of luminous intensity is another example of the emitter selecting method. A method in which the desired number of SLEDs 50 from SLEDs 50 are selected by selecting those having a luminous intensity equal to or greater than the lower limit is still another example of the emitter selecting method. When the lower limit is defined as illustrated in FIG. 12, defective SLEDs 50 with a rank of D are excluded.

In FIG. 11, SLEDs 50$_{11}$ to 50$_{118}$ in the first row may be selected as a general rule, but SLEDs 50$_{21}$ to 50$_{218}$ in the second row may be selected if a defect exists in the SLEDs 50 in the first row. In such cases, SLED 50$_{27}$, SLED 50$_{210}$, and SLED 50$_{216}$ having ranks in the range of A-C are selected instead of SLED 50$_{17}$, SLED 50$_{110}$, and SLED 50$_{116}$ whose ranks are each D.

In Step 108, the portion of SLEDs 50 that have been selected as the emitters are respectively correlated with plural beam spots 62. As illustrated in FIG. 7, 18 SLEDs 50 are correlated with the 18 beam spots 62$_1$ to 62$_{18}$ such that the SLED 50$_{11}$ is correlated with the beam spot 62$_1$, SLED 50$_{13}$ is correlated with the beam spot 62$_2$, and SLED 50$_{217}$ is correlated with the beam spot 62$_{18}$. The correspondence relationship between each beam spot 62 and each SLED 50 (emitter) is stored in the predetermined storage device, for example, in the form of Table 2 given below.

TABLE 2

| Spot number ($62_k$) | Light-emitting device number ($50_{mn}$) |
| --- | --- |
| $62_1$ | $50_{11}$ |
| $62_2$ | $50_{13}$ |
| . | . |
| . | . |
| . | . |
| $62_{18}$ | $50_{217}$ |

Alternatively, as illustrated in Table 3, the correspondence relationship between the positional coordinate of beam spot 62 and the positional coordinate of SLED 50 (emitter) may be stored in the table such that the positional coordinate $(X_{S1}, Y_{S1}, Z_{S1})$ of the beam spot 62$_1$ corresponds to the positional coordinate $(X_{11}, Y_{11}, 0)$ of SLED 50$_{11}$. The positional coordinate of the beam spot 62 is previously stored as the design value in the predetermined storage device.

TABLE 3

| Spot number $62_k$ | Position of beam spot $62_k$ (coordinates) | Position of emitter (coordinates) |
|---|---|---|
| $62_1$ | $(X_{S1}, Y_{S1}, Z_{S1})$ | $(X_{11}, Y_{11}, 0)$ |
| $62_2$ | $(X_{S2}, Y_{S2}, Z_{S2})$ | $(X_{13}, Y_{13}, 0)$ |
| . | . | . |
| . | . | . |
| . | . | . |
| $62_{18}$ | $(X_{S18}, Y_{S18}, Z_{S18})$ | $(X_{217}, Y_{217}, 0)$ |

In Step 110, in order to record the hologram, recording conditions are obtained for each of the plural holographic optical elements 54 corresponding to the portion of SLEDs 50 selected as the emitters. As shown in Table 3, when the correspondence relationship between the positional coordinates of the beam spot 62 and the positional coordinates of SLED 50 is determined, the position at which the holographic optical element 54 is formed is specified according to the positional coordinates of the SLED 50 corresponding to the beam spot 62. The properties of the signal beam and reference beam, such as the irradiation position, the irradiation angle, the spread angle, and the convergent angle, are set for each selected LED 50 according to the positional coordinates of the beam spot 62 and SLED 50, the luminous intensity of SLED 50, and the design values (hologram diameter $r_H$ and hologram thickness $h_H$) of the holographic optical element 54. That is, hologram recording conditions are obtained.

In Step 112, the control signal is sent to the stage driving section 206 to move LPH 14 to a position at which a first hologram is recorded. In response to the control signal, the stage driving section 206 drives the stage 136 to retain LPH 14 at the recording position illustrated by the solid line. The "recording position" means a position at which the designed reference beam is converged onto SLED 50 corresponding to the first hologram.

In Step 114, control signals for recording the first hologram are sent to the lens driving section 208, the mirror driving section 212, the laser driving section 202, and the shutter driving section 204. In response to the control signals, the rotary mirror 130 is rotated on its rotating axis 132, and the lens 134 is moved, and the optical system is disposed such that LPH 14 is irradiated with the designed signal beam.

The shutter driving section 204 drives the shutter 102 such that the shutter 102 is in the open state, and the laser driving section 202 drives the laser source 100 to be turned on and emit the laser beam. When the laser source 100 emits the laser beam, the hologram recording operation is performed as described above, and the first hologram is recorded with the designed signal beam and reference beam. After the hologram is recorded, the shutter driving section 204 drives the shutter 102 such that the shutter 102 is put into the closed state, and the laser driving section 202 drives the laser source 100 to be turned off.

In Step 116, a control signal is sent to the stage driving section 206 to move LPH 14 to the position in which the next hologram is recorded. In response to the control signal, the stage driving section 206 drives the stage 136 to retain LPH 14 at the recording position illustrated by the solid line. The "recording position" means a position at which the designed reference beam is converged onto SLED 50 corresponding to the next hologram.

In Step 118, control signals for recording the next hologram are fed into the lens driving section 208, the mirror driving section 212, the laser driving section 202, and the shutter driving section 204. In response to the control signals, each section is driven to perform the hologram recording operation, and the next hologram is recorded with the designed signal beam and reference beam. After the hologram is recorded, the shutter 102 is put into the closed state, and the laser source 100 is turned off.

In Step 120, the control section 200 determines whether the next hologram to be recorded exists. If the next hologram to be recorded exists, the flow returns to Step 116 to record the next hologram. If the next hologram to be recorded does not exist, the control section 200 determines that all the holograms are recorded, and the control section 200 determines to end the processing routine.

Other Exemplary Embodiments

In the exemplary embodiment, the LED printhead includes plural LEDs (including SLEDs). Alternatively, other light-emitting devices such as an Electro Luminescent (EL) device and a Laser Diode (LD) may be used instead of an LED. In the exposure apparatus including an LD as a coherent light source, energy use efficiency is higher than that of the exposure apparatus including an incoherent light source. However, if unnecessary exposure of incoherent light is prevented and a holographic optical element is designed according to a characteristic of the light-emitting device, even if an LED or an EL that emits the incoherent light is used as the light-emitting device, a micro beam spot having a clear outline can be formed similar to when an LD that emits coherent light is used as the light-emitting device.

In the exemplary embodiment, plural LEDs are arrayed along the length direction of the LED array. Alternatively, a light-emitting device array (light source array) such as an LED array may be formed by a one-dimensional array, or a two-dimensional array. For example, a surface-emitting laser array in which vertical cavity surface-emitting lasers (VC-SEL) are arrayed one-dimensionally or two-dimensionally may be used. As described in the exemplary embodiment, the light source array includes an excess of light-emitting devices, the position and luminous intensity of each of the plural light-emitting devices are measured, and a portion of the light-emitting devices are selected based on the measurement values and used as emitters. Therefore, even if deficiencies such as defects, variations in luminous intensity, and positional deviation exist in the light source array, these can be compensated for by appropriately selecting the emitters.

In the exemplary embodiment, the plural holographic optical elements are plurally-recorded by shift multiplexing with a spherical wave. Alternatively, the plural holographic optical elements may be plurally-recorded by another multiplexing method as long as the desired diffracted light is obtained by the multiplexing method Plural kinds of multiplexing methods may be used simultaneously. Examples of another multiplexing method include angle-multiplexing, in which the holographic optical elements are recorded while the incident angle of the reference beam is changed, wavelength-multiplexing, in which the holographic optical elements are recorded while the wavelength of the reference beam is changed, and phase-multiplexing, in which the holographic optical elements are recorded while the phase of the reference beam is changed. When multiple recording is performed, the different pieces of diffracted light may be reconstructed with no crosstalk from the plurally-recorded plural holograms.

In the exemplary embodiment, the image forming apparatus is a tandem digital color printer, and the LED printhead is an exposure apparatus that exposes the photosensitive drum of each image forming unit of the image forming apparatus. However, an image forming apparatus in which the exposure apparatus exposes a photosensitive image recording medium to form an image may be used, and the invention is not limited to the exemplary embodiment. For example, the image forming apparatus is not limited to an electrophotographic digital color printer. The exposure apparatus of the invention may be mounted on a writing apparatus such as a silver-salt photographic image forming apparatus or photo-addressable electronic paper. The photosensitive image recording medium is not limited to the photosensitive drum. The exposure apparatus of the invention may be applied to the exposure of a sheet-like photosensitive material, a photosensitive material (for silver salt photograph), a photoresist, or a photopolymer.

What is claimed is:

1. An exposure apparatus comprising:
 a substrate in which a plurality of light-emitting devices are arrayed one-dimensionally or two-dimensionally; and
 a hologram recording layer that is disposed on the substrate, a plurality of holograms being recorded in the hologram recording layer at each positions corresponding to emitters that are selected from a subset, but not all, of the plurality of light-emitting devices by holographic interference between a first beam and a second beam, the second beam converging onto beam spots that are arranged on a predetermined line, wherein
 the first beam passes through an optical path of diffusion light that passes through the hologram recording layer from a position corresponding to the emitter, and
 the second beam passes through an optical path of convergent light that converges at a predetermined distance outside the optical path of the first beam.

2. The exposure apparatus of claim 1, wherein the plurality of light-emitting devices are arrayed such that an interval between two adjacent light-emitting devices in a length direction of the substrate is a predetermined first interval, and
 a diameter in the length direction of the substrate of each of the plurality of holograms is larger than the first interval.

3. The exposure apparatus of claim 1, wherein, based on a luminous intensity detected from each of the plurality of light-emitting devices, a portion of the light-emitting devices are selected as the emitters from the plurality of light-emitting devices in descending order of luminous intensity.

4. The exposure apparatus of claim 1, wherein a lower limit of luminous intensity is set in advance, and
 based on a luminous intensity detected from each of the plurality of light-emitting devices, the emitters are selected from the light-emitting devices having a luminous intensity that is equal to or greater than the lower limit.

5. The exposure apparatus of claim 4, wherein a lower limit and an upper limit of luminous intensity are set in advance, and
 based on the luminous intensity detected from each of the plurality of light-emitting devices, the emitters are selected from the light-emitting devices having a luminous intensity that is equal to or greater than the lower limit and equal to or less than the upper limit.

6. An image forming apparatus comprising:
 an exposure apparatus including:
 a substrate in which a plurality of light-emitting devices are arrayed one-dimensionally or two-dimensionally; and
 a hologram recording layer that is disposed on the substrate, a plurality of holograms being recorded in the hologram recording layer at each positions corresponding to emitters that are selected from a subset, but not all, of the plurality of light-emitting devices by holographic interference between a first beam and a second beam, the second beam converging onto beam spots that are arranged on a predetermined line, wherein
 the first beam passes through an optical path of diffusion light that passes through the hologram recording layer from a position corresponding to the emitter, and
 the second beam passes through an optical path of convergent light that converges at a predetermined distance outside the optical path of the first beam;
 a photosensitive image recording medium in which an image is recorded by exposure of the exposure apparatus;
 a moving unit that moves the image recording medium relative to the exposure apparatus;
 a driving unit that drives each of the plurality of light-emitting devices to turn on or turn off; and
 a control unit that controls the driving unit and the moving unit based on image information such that the image recording medium is slow-scanned in a direction intersecting a length direction of the substrate while each of the emitters is driven.

7. A hologram recording apparatus that records a plurality of holograms in a hologram recording layer in a process of producing an exposure apparatus, the exposure apparatus including:
 a substrate in which a plurality of light-emitting devices are arrayed one-dimensionally or two-dimensionally; and
 a hologram recording layer that is disposed on the substrate, a plurality of holograms being recorded in the hologram recording layer at each positions corresponding to emitters that are selected from a subset, but not all, of the plurality of light-emitting devices by holographic interference between a first beam and a second beam, the second beam converging onto beam spots that are arranged on a predetermined line, wherein
 the first beam passes through an optical path of diffusion light that passes through the hologram recording layer from a position corresponding to the emitter, and
 the second beam passes through an optical path of convergent light that converges at a predetermined distance outside the optical path of the first beam;
 the hologram recording apparatus comprising:
 a light irradiation unit that irradiates the hologram recording layer formed on the substrate with the first beam and the second beam in order to record the hologram;
 a moving unit that moves the substrate in which the hologram recording layer is formed;
 a selecting unit that selects emitters from a subset, but not all, of the plurality of light-emitting devices based on a luminous intensity and a position of each of the plurality of light-emitting devices;
 an obtaining unit that obtains recording conditions necessary to record each of the plurality of holograms corresponding to each of the emitters, based on a luminous intensity, a position of each of the emitters, and a position of each of the beam spots, such that light emitted from one of the emitters converges onto a corresponding one of the beam spots, the recording conditions including irradiation illuminance of the first beam, irradiation illuminance of the second beam, an irradiation angle, an irradiation position, and an irradiation time; and
 a control unit that controls the light irradiation unit and the moving unit such that the plurality of holograms corresponding to the emitters are sequentially recorded in the hologram recording layer, based on the recording conditions obtained by the obtaining unit.

* * * * *